US012302081B2

(12) United States Patent
Zhou

(10) Patent No.: US 12,302,081 B2
(45) Date of Patent: May 13, 2025

(54) MULTI-INPUT-DRIVING LOUDSPEAKER

(71) Applicant: SUZHOU SONAVOX ELECTRONICS CO., LTD., Jiangsu (CN)

(72) Inventor: Jianming Zhou, Jiangsu (CN)

(73) Assignee: Suzhou Sonavox Electronics Co., Ltd., Jiangsu (CN)

( * ) Notice: Subject to any disclaimer, the term of this patent is extended or adjusted under 35 U.S.C. 154(b) by 0 days.

(21) Appl. No.: 18/583,750

(22) Filed: Feb. 21, 2024

(65) Prior Publication Data

US 2024/0244380 A1 Jul. 18, 2024

Related U.S. Application Data

(63) Continuation of application No. 17/619,219, filed as application No. PCT/CN2019/112641 on Oct. 23, 2019, now Pat. No. 11,943,598.

(30) Foreign Application Priority Data

Jun. 20, 2019 (CN) ........................ 201920932934.7

(51) Int. Cl.
*H04R 9/06* (2006.01)
*H04R 1/02* (2006.01)
*H04R 3/12* (2006.01)

(52) U.S. Cl.
CPC ............ *H04R 9/063* (2013.01); *H04R 1/025* (2013.01); *H04R 3/12* (2013.01);
(Continued)

(58) Field of Classification Search
CPC .......... H04R 9/063; H04R 1/025; H04R 3/12; H04R 2201/401; H04R 2209/024; H04R 2400/11
See application file for complete search history.

(56) References Cited

U.S. PATENT DOCUMENTS 4,252,211 A * 2/1981 Matsuda .................. H04R 7/26 181/173
6,748,090 B1 6/2004 Bachmann et al.
(Continued)

FOREIGN PATENT DOCUMENTS

CN 1121678 5/1996
CN 201263213 6/2009
(Continued)

OTHER PUBLICATIONS

International Search Report and Written Opinion issued for International Patent Application No. PCT/CN2019/112641, dated Mar. 9, 2020 in 9 pages.

(Continued)

*Primary Examiner* — Sunita Joshi
(74) *Attorney, Agent, or Firm* — Knobbe, Martens, Olson & Bear, LLP

(57) ABSTRACT

A multi-input-driving loudspeaker including a frame, a diaphragm arranged on the frame, and a plurality of input driving mechanisms. Each input driving mechanism includes a voice coil and a magnetic circuit assembly for driving the voice coil to vibrate. A plurality of magnetic circuit mounting holes are arranged on the frame. A plurality of voice coil mounting holes are arranged on the diaphragm. Each of the input driving mechanisms further includes a damper. Each of the voice coils is sleeved with one of the dampers. The frame has a plurality of flanges surrounding the magnetic circuit mounting holes. Each of the dampers and each of the flanges cooperate with each other so that each damper is embedded between an inner walls of the flange corresponding therewith.

13 Claims, 3 Drawing Sheets

(52) U.S. Cl.
CPC .. *H04R 2201/401* (2013.01); *H04R 2209/024* (2013.01); *H04R 2400/11* (2013.01)

(56) References Cited

U.S. PATENT DOCUMENTS

| | | | | |
|---|---|---|---|---|
| 8,204,269 | B2 * | 6/2012 | Sahyoun ................ | H04R 9/043 381/398 |
| 2013/0051604 | A1 | 2/2013 | Sakai | |
| 2020/0344554 | A1 * | 10/2020 | Scheek .................... | H04R 7/26 |

FOREIGN PATENT DOCUMENTS

| | | |
|---|---|---|
| CN | 201263213 Y * | 6/2009 |
| CN | 204733375 | 10/2015 |
| JP | A 2013-051499 | 3/2013 |

OTHER PUBLICATIONS

Extended European Search Report for Application No. EP19933994.6, dated Jun. 1, 2023 in 18 pages.
Japanese Final Rejection for Application No. JP2021-575269, dated Jul. 25, 2023, in 5 pages.
Japanese First Office Action for Application No. JP2021-575269, dated Dec. 26, 2022, in 10 pages.

* cited by examiner

MULTI-INPUT-DRIVING LOUDSPEAKER

CROSS-REFERENCE TO RELATED APPLICATIONS

This application is a continuation of U.S. application Ser. No. 17/619,219, filed Dec. 14, 2021, and which is the U.S. National Phase under 35 U.S.C. § 371 of International Application PCT/CN2019/112641, filed Oct. 23, 2019, which claims priority from Chinese Patent Application CN 201920932934.7, filed Jun. 20, 2019, the disclosures of which are incorporated herein by reference in their entireties.

TECHNICAL FIELD

The present disclosure relates to the loudspeaker field, in particular to a multi-input-driving loudspeaker.

BACKGROUND

Existing loudspeakers generally adopt a structure comprising a conical diaphragm (made of paper, PP and other materials) combined with a damper, the middle of the conical diaphragm and the damper is respectively provided with a central hole, the damper is arranged below the conical diaphragm, a single signal input voice coil passes through the center holes of the damper and the conical diaphragm, and the conical diaphragm and the damper are glued on the voice coil respectively to form a loudspeaker vibration system. This kind of loudspeaker can only be used for single signal input and has limitations on the reproduction of the original sound.

Therefore, one of the current improvements is to adopt a structure comprising: a conical diaphragm combined with a damper with a central hole in the middle thereof diaphragm respectively, the damper is arranged under the conical diaphragm, and the voice coil is changed from the single signal input mode to a multiple signal input mode and passes through the center holes of the damper and the conical diaphragm, wherein the voice coil is formed by stacking multiple sets of coils from the inside to the outside, and the conical diaphragm and the damper are glued on the outer wall of the voice coil respectively to form a loudspeaker vibration system. This kind of loudspeaker can be used for multiple signal input. However, since this type of loudspeaker has multiple sets of coils wound on one voice coil, winding multiple sets of coils on one voice coil increases the weight of the voice coil, and when the voice coil drives the diaphragm, the sensitivity of the loudspeaker will be lost.

SUMMARY

In view of the above-mentioned problems, the present disclosure provides a multi-input-driving loudspeaker, which reduces the distortion of a loudspeaker and also improves the sensitivity and the intelligibility of the loudspeaker.

To achieve the above purpose, the technical solution employed by the present disclosure is:

a multi-input-driving loudspeaker comprises a frame, and a diaphragm arranged on the frame, and the loudspeaker further comprises a plurality of input driving mechanisms, each input driving mechanism comprises a voice coil and a magnetic circuit assembly for driving the voice coil to vibrate;

a plurality of magnetic circuit mounting holes are arranged on the frame, and at most one magnetic circuit assembly is arranged at each magnetic circuit mounting hole;

a plurality of voice coil mounting holes are arranged on the diaphragm, and at most one voice coil is provided at each voice coil mounting hole.

Herein, "multi-input" refers to multiple audio signal inputs, "multi-input driving" refers to multiple audio signals input to multiple voice coils, and the multiple voice coils jointly drive the loudspeaker to produce sound.

In an embodiment, there are three or more input driving mechanisms, and the three or more input driving mechanisms are arranged at equal intervals along a circumference.

In an embodiment, the diaphragm has a diaphragm bottom that is circular as a whole and shaped as a flat plate, and a center of the circumference coincides with a center of the diaphragm bottom.

In an embodiment, three or more voice coil mounting holes are arranged on the diaphragm bottom, the three or more voice coil mounting holes are arranged at equal intervals along the circumference, each of the voice coil mounting holes is provided with one voice coil so that the voice coil is connected with the diaphragm bottom.

In an embodiment, the diaphragm further comprises a tapered edge portion extending obliquely upwards from an outer edge of the diaphragm bottom, and the tapered edge portion is fixedly connected to the frame through a yoke ring.

In an embodiment, the frame is provided with three or more magnetic circuit mounting holes, the three or more magnetic circuit mounting holes are arranged at equal intervals along the circumference, each of the magnetic circuit mounting holes is provided with one magnetic circuit assembly.

In an embodiment, each of the input driving mechanisms further comprises a damper, and each of the voice coils is sleeved with one of the dampers.

In an embodiment, the frame has a plurality of flanges surrounding the magnetic circuit mounting holes, and each of the dampers and each of the flanges cooperate with each other so that each damper is embedded between an inner wall of the flange corresponding therewith.

In an embodiment, each of the input driving mechanisms further comprises a dust cover, and each of the voice coil mounting holes is covered with one of the dust cover.

In an embodiment, each magnetic circuit assembly comprises a U-yoke having an inner cavity, a magnetic steel and a magnetic pole core arranged within the U-yoke, a magnetic gap is formed between the magnetic steel and the magnetic pole core and an inner wall of the U-yoke, the voice coil is inserted in the magnetic gap and capable of moving in an up-and-down direction, and an upper edge of the U-yoke is fixedly connected to the magnetic circuit mounting hole of the frame.

In an embodiment, the frame is provided with multiple pairs of audio signal input terminals, each pair of audio signal input terminals is electrically connected to leads of one voice coil.

In an embodiment, a plurality of reinforcing ribs are arranged on the diaphragm.

In an embodiment, the plurality of input driving mechanisms is arranged along a circle, a straight line, or an array.

In an embodiment, the loudspeaker further comprises three or more input-driving mechanisms, the three or more input driving mechanisms are arranged at equal intervals along a circumference, the diaphragm has a diaphragm bottom that is circular as a whole and shaped as a flat plate, a center of the circumference coincides with a center of the diaphragm bottom, the diaphragm bottom is provided with three or more voice coil mounting holes, center lines of the voice coil mounting holes pass through the circumference, each of the voice coil mounting holes is provided with one voice coil so that the voice coil is connected with the diaphragm bottom, each of the input driving mechanisms further comprises a damper, each of the voice coils is sleeved with one of the damper, the frame is provided with a plurality of flanges surrounding the magnetic circuit mounting holes, and each of the dampers and each of the flanges cooperate with each other so that each damper is embedded between an inner wall of the flange corresponding therewith.

Due to the use of the above technical solutions, the present disclosure has the following advantages over the prior art:

in the multi-input-driving loudspeaker of the present disclosure, the structure is ingenious and rational, and the original sound reproduction and distortion are better than that of traditional loudspeakers by receiving audio signal input via multiple voice coils; by the input-driving structure formed by a plurality of voice coils and a plurality of magnetic circuit assemblies, the sensitivity of the loudspeaker is increased, and the intelligiblity of the loudspeaker is improved.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

Figure 1:
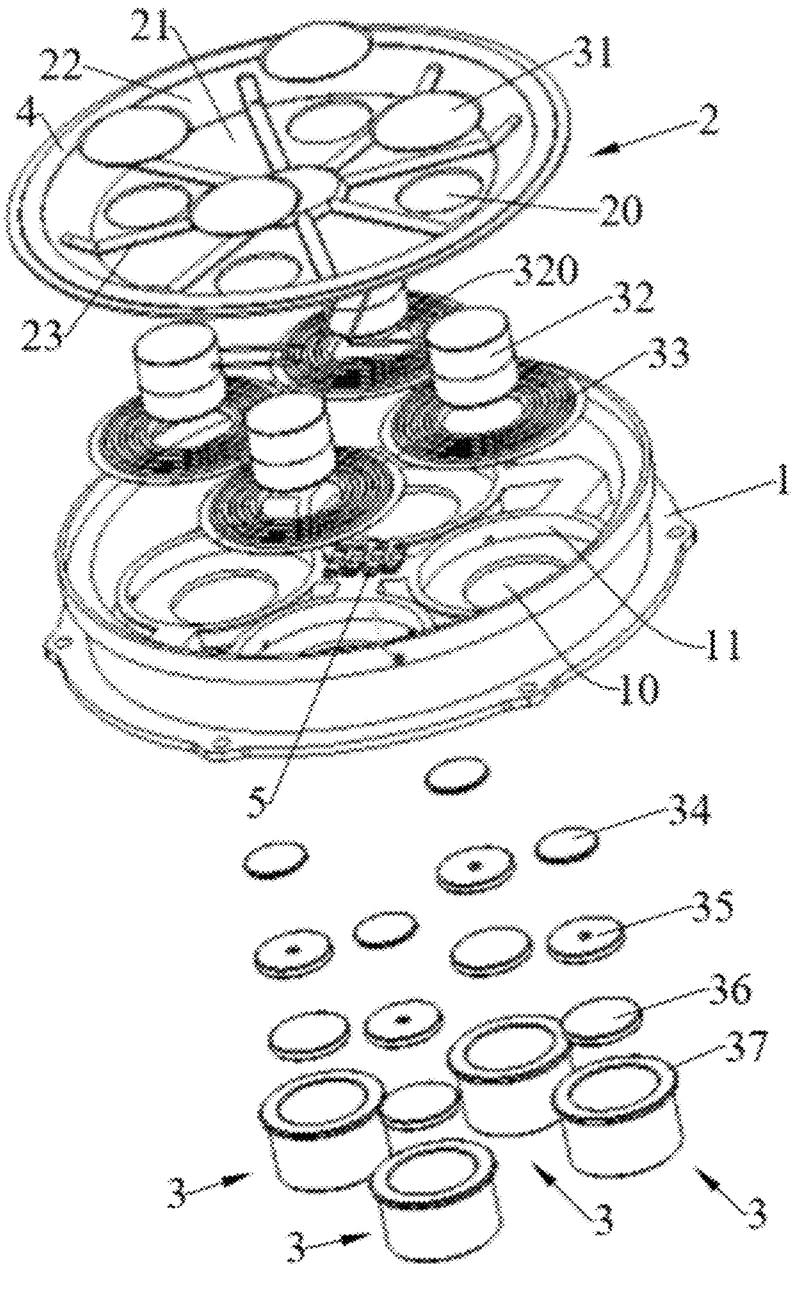
FIG. 1 is a schematic structure diagram of a loudspeaker according to an embodiment.

wherein,

1—frame; 10—magnetic circuit mounting hole; 11—flange; 2—diaphragm; 20—voice coil mounting hole; 21—diaphragm bottom; 22—tapered edge portion; 23—reinforcing rib; 3—input drive mechanism; 31—dust cover; 32—voice coil; 320—lead; 33—damper; 34—secondary neodymium magnetic steel; 35—magnetic pole core; 36—main neodymium magnetic steel; 37—U-yoke; 4—yoke ring; 5—audio signal input terminal.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

This embodiment provides a multi-input-driving loudspeaker, herein, "multi-input" refers to multiple audio signal inputs, multiple audio signals are input to multiple voice coils, and the multiple voice coils jointly drive the loudspeaker to produce sound. Referring to FIG. 1 to FIG. 4, the multi-input-driving loudspeaker comprises a frame 1, a diaphragm 2, and a plurality of input driving mechanisms 3. The diaphragm 2 is used to vibrate to produce sound, and is fixed arranged on the frame 1. Each input driving mechanism 3 comprises a voice coil 32 and a magnetic circuit assembly for driving the voice coil 32 to vibrate; wherein, the frame 1 is provided with a plurality of magnetic circuit mounting holes 10, and at most one magnetic circuit assembly is arranged at each magnetic circuit mounting hole 10; the diaphragm 2 is provided with a plurality of voice coil mounting holes 20, and at most one voice coil 32 is provided at each voice coil mounting hole 20. That is, the plurality of input-driving mechanisms is mounted on the frame 1 and the diaphragm 2. There are three or more input driving mechanisms 3 to increase the driving energy of the loudspeaker, and the three or more input driving mechanisms 3 are arranged at equal intervals along a circumference. The diaphragm has a diaphragm bottom 21 that is circular as a whole and shaped as a flat plate, and the center of the circumference coincides with the center of the diaphragm bottom 21, that is, the plurality of input driving mechanisms 3 is arranged at equal intervals along the circumference of the diaphragm bottom 21. Correspondingly, the diaphragm bottom 21 is provided with three or more voice coil mounting holes 20, the center lines of the voice coil mounting holes 20 pass through the circumference, and each of the voice coil mounting holes 20 is provided with one voice coil 32 so that the voice coil 32 is connected with the diaphragm bottom 21; the frame 1 is provided with three or more magnetic circuit mounting holes 10, the magnetic circuit mounting holes 10 are arranged at equal intervals along the circumference, and each of the magnetic circuit mounting holes 10 is provided with one magnetic circuit assembly. Specifically, as shown in FIGS. 1-4, the number of the input driving mechanisms 3, the voice coil mounting holes 20 and the magnetic circuit mounting holes 10 are all four, and they are arranged in a ring around the center of the diaphragm bottom 21.

In this embodiment, the frame 1 is made of plastic using processes such as injection molding, which is easy to form and has a certain strength, and the magnetic circuit mounting holes 10 are through holes that penetrate the frame 1 from top to bottom. The diaphragm 2 further comprises a tapered edge portion 22 extending obliquely upwards from the outer edge of the diaphragm bottom 21, and the tapered edge portion 22 is arranged in a circle around the diaphragm bottom 21. The diaphragm 2 is made of paper pulp, PP (polypropylene), ballistic fiber or aluminum alloy, and the made diaphragm 2 is light in weight, has good damping elasticity and rigidity, high temperature and low temperature resistance, waterproof and mildew proof. In addition, the tapered edge portion 22 of the diaphragm 2 is fixedly connected to the frame 1 through a yoke ring 4, which is made of sponge, rubber, or cloth. With the diaphragm 2 with the above-mentioned shape, the directional expansion width is superior to that of the traditional conical loudspeaker, and the height is lower than that of the traditional conical diaphragm 2, which is beneficial to reducing the overall height of the loudspeaker.

Figure 3:
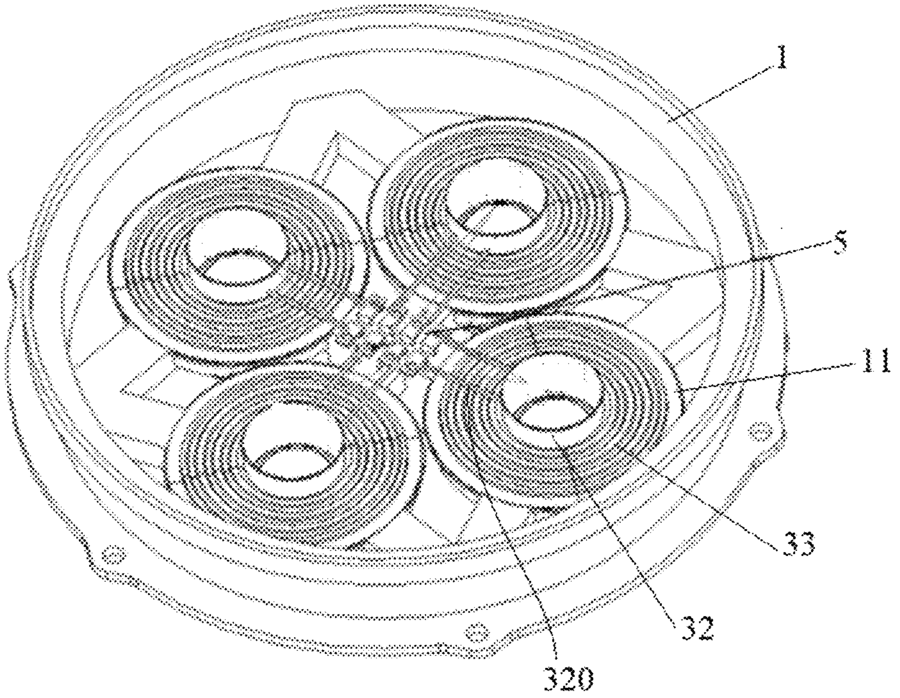
FIG. 3 is a schematic diagram of the frame in FIG. 1 after the magnetic circuit assemblies, the voice coils and the dampers are mounted.

Each input-driving mechanism 3 also comprises a dust cover 31 and a damper 33 respectively. The specific mechanism of the input-driving mechanisms 3 will be described in detail below. As shown in FIG. 1, each input-driving mechanism 3 is consisted of a dust cover 31, a voice coil 32, a damper 33, a secondary neodymium magnetic steel 34, a magnetic pole core 35, a main neodymium magnetic steel 36, and a U-yoke 37. In each of the input-driving mechanism 3, the dust cover 31 is fixedly connected to the diaphragm 2, each voice coil mounting hole 20 is covered with one dust cover 31, and the voice coil 32 is covered under the dust cover 21. The upper end portion of the voice coil 32 is inserted into and close fit with the voice coil mounting hole 20 of the diaphragm 2, and the voice coil 32 is connected to the diaphragm 2 to drive the diaphragm 2 to vibrate. The damper 33 is provided with a through hole in the middle so as to be sleeved on the voice coil 32, the outer periphery of the voice coil is tightly connected with the through hole, and with the restriction of the damper 33, the voice coil can only move up and down, and cannot produce movement in the horizontal direction; the damper 33 is specifically located in a cavity formed between the frame 1 and the diaphragm 2 after they are connected, the upper surface of the frame 1 has a plurality of upwardly extending flanges 11 surrounding the magnetic circuit mounting holes 10, each of the magnetic circuit mounting holes 10 is surrounded by one flange 11, and each damper 33 and each flange 11 cooperate with each other so that they are fitted closely, so that the damper 33 can be embedded between the inner wall of the flange 11 (as shown in FIG. 3), to prevent the damper 33 from shaking. The U-yoke 37 has an inner cavity and an open upper end, the upper edge of the U-yoke is fixedly connected at the magnetic circuit mounting hole 10 (such as the hole wall of the magnetic circuit mounting hole 10, or the lower surface of the frame 1 close to the magnetic circuit mounting hole 10), and the magnetic circuit mounting hole 10 is in communication with the inner cavity of the U-yoke 37; the secondary neodymium magnetic steel 34, the magnetic pole core 35, and the main neodymium magnetic steel 36 are stacked from top to bottom, and are fixedly arranged in the inner cavity of the U-yoke 37, to form a magnetic circuit assembly; the lower surface of the secondary neodymium magnetic steel 34 is closely attached to the upper surface of the magnetic pole core 35, and the lower surface of the magnetic pole core 35 is closely attached to the upper surface of the main neodymium magnetic steel 36; there are a gap between the secondary neodymium magnetic steel 34, the magnetic pole the core 35 and the main neodymium magnetic steel 36 and the inner wall of the U-yoke 37, thereby forming a magnetic gap surrounding the secondary neodymium magnetic steel 34, the magnetic pole core 35 and the main neodymium magnetic steel 36, the lower end of the voice coil 32 is inserted into the magnetic gap downward from the magnetic circuit mounting hole 10, there is a gap between the voice coil 32 and the secondary neodymium magnetic steel 34, the magnetic pole core 35 and the main neodymium magnet 36, and there is also a gap between it and the inner wall of the U-yoke 37, so that it can move up and down in the magnetic gap.

Figure 2:
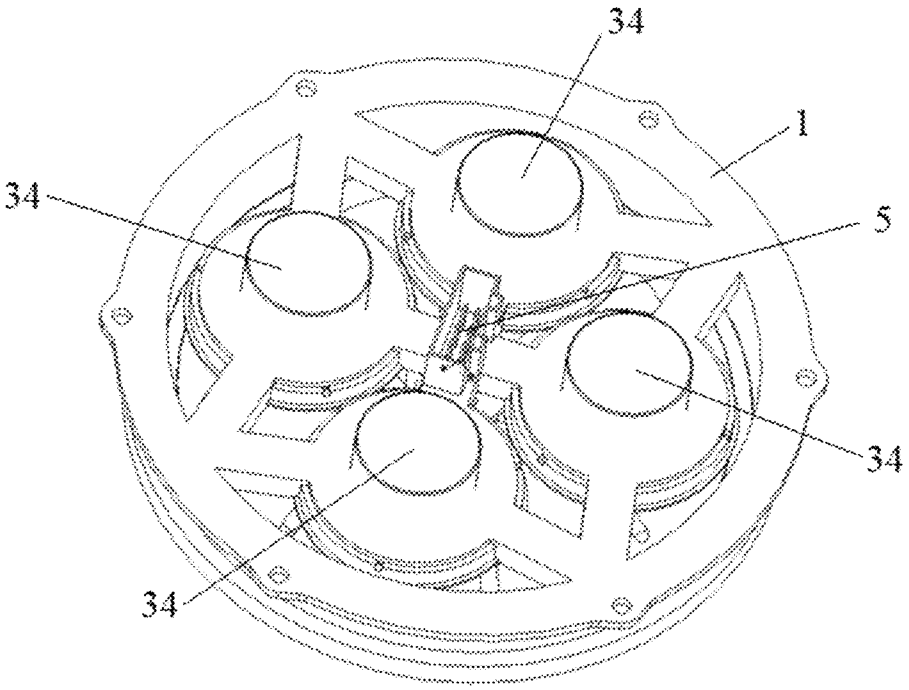
FIG. 2 is a schematic diagram of the frame in FIG. 1 after the magnetic circuit assemblies are mounted.

As shown in FIG. 2 and FIG. 3, the frame 1 is provided with multiple pairs of audio signal input terminals 5, each pair of audio signal input terminals 5 is electrically connected to a lead of one voice coil 32. Wherein, each pair of audio signal input terminals 5 comprises a positive terminal and a negative terminal, one lead of each voice coil 32 is electrically connected to the positive terminal of one pair of audio signal input terminals 5, and another lead is electrically connected to the negative terminal of this pair of audio signal input terminals 5, to receive the audio signal (analog signal or digital signal) input from the pair of audio signal input terminal 5. Thus, four voice coils 32 are simultaneously driven through the four pairs of audio signal input terminals 5. By providing multiple integrated terminals for audio signal input in the frame 1, the positive and negative leads of each voice coil 32 can be connected to the intermediate terminals at the bottom of the frame 1, and this connection method simplifies the manufacture of multi-input-driving loudspeakers, and is also convenient for the connection of audio signal input.

Figure 4:
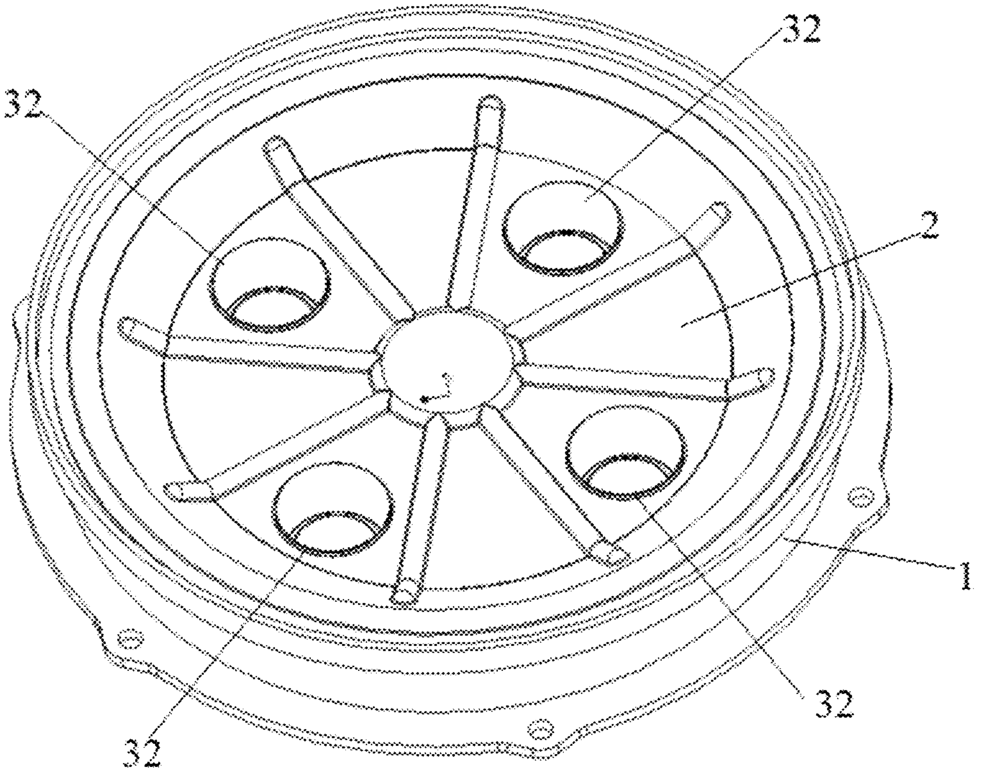
FIG. 4 is a schematic diagram of the frame and the diaphragm after the voice coils are mounted in FIG. 1.

As shown in FIG. 4, a plurality of reinforcing ribs 23 are arranged on the diaphragm 2, which can increase the working strength of the diaphragm 2. Specifically, as shown in FIG. 4, a plurality of reinforcing ribs 23 are arranged at equal intervals along the circumferential direction of the diaphragm 2, and each reinforcing rib 23 extends along the radial direction of the diaphragm 2. The ribs 23 are located between the voice coil mounting holes 20.

The working principle of the multi-input-driving loudspeaker is: the audio signal is input to the plurality of voice coils 32 through the audio signal input terminals 5 on the frame 1, and the plurality of voice coils 32 move up and down synchronously under the action of the magnetic circuit assemblies, thereby driving the diaphragm 2 to vibrate to produce sound. The multi-input-driving loudspeaker of the present disclosure adopts a diaphragm 2 with a flat plate shaped bottom, three or more voice coil mounting holes 20 are provided on the plane formed by the diaphragm bottom 21, and tightly fitted with three or more voice coils 32, and then the voice coils 32 are tightly fitted with three or more dampers 33 to form three or more input-driving mechanisms 3, and by using three or more magnetic circuit assemblies to drive the voice coils 32, and three or more voice coils 32 to drive the voice diaphragm 2, it can not only reduce the height of the product, but also broaden the directivity of the product, and through multiple audio signal inputs, it can reduce the distortion of the product, increase the sensitivity of the loudspeakers, and improve the intelligiblity of the loudspeaker. The use of integrated terminals simplifies the connection of the product and facilitates the connection of audio signal input.

The loudspeaker structure is ingenious and rational, and through the use of a flat-bottom conical diaphragm structure, the flat-bottom conical diaphragm has a better directivity than traditional loudspeakers; by receiving the audio signal input via three or more voice coils, the original sound reproduction and distortion are better than that of traditional loudspeakers; by adopting a diaphragm with a flat-bottom, the height of the diaphragm is lower than that of the traditional conical diaphragm, and the reduction of the height of the diaphragm can also reduce the height of the product; by using an input-driving structure composed of three or more voice coils and three or more magnetic circuit assemblies, the sensitivity of the loudspeaker is increased; by closely connecting the flat-bottom conical diaphragm with three or more voice coils, the three or more voice coils are driven through three or more audio signal inputs to move up and down in the U-yoke magnetic circuit to drive the diaphragm to sound.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

We claim:

1. A multi-input-driving loudspeaker comprising:

a frame;

a diaphragm arranged on the frame;

a plurality of input driving mechanisms, each input driving mechanism comprising a voice coil and a magnetic circuit assembly for driving the voice coil to vibrate;

a plurality of magnetic circuit mounting holes arranged on the frame, wherein at most one magnetic circuit assembly is arranged at each of the plurality of magnetic circuit mounting holes; and a plurality of voice coil mounting holes are arranged on the diaphragm, wherein at most one voice coil is provided at each of the plurality of voice coil mounting holes, wherein each magnetic circuit assembly comprises a U-yoke having an inner cavity, a magnetic steel and a magnetic pole core arranged within the U-yoke, a magnetic gap is formed between the magnetic steel and the magnetic pole core and an inner wall of the U-yoke, wherein the voice coil is inserted in the magnetic gap and capable of moving in an up-and-down direction, and an upper edge of the U-yoke is fixedly connected to a respective magnetic circuit mounting hole of the plurality of magnetic circuit mounting holes of the frame, and wherein the upper edge of the U-yoke is fixedly connected to an inner hole-wall of the respective magnetic circuit mounting hole of the plurality of magnetic circuit mounting holes or a lower surface of the frame adjacent to the respective magnetic circuit mounting hole of the plurality of magnetic circuit mounting holes.

2. The loudspeaker according to claim 1, wherein each of the plurality of input driving mechanisms further comprises a corresponding damper, and each voice coil of the plurality of input driving mechanisms is sleeved with the corresponding damper, wherein a plurality of flanges surrounding the plurality of magnetic circuit mounting holes are arranged on the frame, and the corresponding damper and each of the plurality of flanges cooperate with each other so that the corresponding damper is embedded between inner walls of a corresponding flange of the plurality of flanges.

3. The loudspeaker according to claim 1, wherein the plurality of input driving mechanisms comprise three or more input driving mechanisms arranged at equal intervals along a circumference of the loudspeaker.

4. The loudspeaker according to claim 3, wherein the diaphragm has a diaphragm bottom that is circular as a whole and shaped as a flat plate, and a center of the circumference of the loudspeaker coincides with a center of the diaphragm bottom.

5. The loudspeaker according to claim 4, wherein three or more of the plurality of voice coil mounting holes are arranged on the diaphragm bottom, wherein the three or more of the plurality of voice coil mounting holes are arranged at equal intervals along the circumference of the loudspeaker, and wherein each of the plurality of voice coil mounting holes is provided with one voice coil so that the one voice coil is connected with the diaphragm bottom.

6. The loudspeaker according to claim 4, wherein the diaphragm further comprises a tapered edge portion extending obliquely upwards from an outer edge of the diaphragm bottom, and the tapered edge portion is fixedly connected to the frame through a yoke ring.

7. The loudspeaker according to claim 4, wherein the diaphragm bottom is a flat plate opened with the plurality of voice coil mounting holes.

8. The loudspeaker according to claim 3, wherein three or more of the plurality of magnetic circuit mounting holes are arranged on the frame, wherein the three or more of the plurality of magnetic circuit mounting holes are arranged at equal intervals along the circumference of the loudspeaker, and wherein each of the plurality of magnetic circuit mounting holes is provided with one magnetic circuit assembly.

9. The loudspeaker according to claim 1, wherein each of the plurality of input driving mechanisms further comprises a dust cover, and each of the plurality of voice coil mounting holes is covered with a corresponding dust cover.

10. The loudspeaker according to claim 1, wherein multiple pairs of audio signal input terminals are arranged on the frame, and each pair of the audio signal input terminals is electrically connected to leads of one voice coil.

11. The loudspeaker according to claim 1, wherein a plurality of reinforcing ribs are arranged on the diaphragm.

12. The loudspeaker according to claim 1, wherein the plurality of input driving mechanisms are arranged along a circle, a straight line, or an array.

13. The loudspeaker according to claim 1, wherein the loudspeaker further comprises three or more input-driving mechanisms, the three or more input-driving mechanisms arranged at equal intervals along a circumference of the loudspeaker, wherein the diaphragm has a diaphragm bottom that is circular as a whole and shaped as a flat plate, and a center of the circumference coincides with a center of the diaphragm bottom, wherein three or more voice coil mounting holes are arranged on the diaphragm bottom such that center lines of each of the three or more voice coil mounting holes pass through the circumference, and each of the three or more voice coil mounting holes is provided with one voice coil so that the one voice coil is connected with the diaphragm bottom, and wherein each of the three or more input-driving mechanisms further comprises a corresponding damper, and each voice coil of the three or more voice coil mounting holes is sleeved with the corresponding damper, wherein a plurality of flanges surrounding the three or more voice coil mounting holes are arranged on the frame, and the corresponding damper and each of the plurality of flanges cooperate with each other so that the corresponding damper is embedded between inner walls of a corresponding flange of the plurality of flanges.

* * * * *